United States Patent [19]
Staschewski

[11] Patent Number: 6,027,011
[45] Date of Patent: Feb. 22, 2000

[54] METHOD AND DEVICE FOR PRODUCING LONG METAL TUBES

[75] Inventor: Harry Staschewski, Langenhagen, Germany

[73] Assignee: Alcatel, Paris, France

[21] Appl. No.: 08/964,545

[22] Filed: Nov. 5, 1997

[30] Foreign Application Priority Data

Nov. 16, 1996 [DE] Germany .......................... 196 47 449

[51] Int. Cl.[7] .......................... B21C 37/08; B21C 37/083
[52] U.S. Cl. .......................... 228/147; 228/148; 228/17.5; 242/167; 242/423
[58] Field of Search .................... 228/144–148, 228/17.5, 5.7; 242/422.1, 423, 423.2, 550, 566, 551

[56] References Cited

U.S. PATENT DOCUMENTS

| | | | |
|---|---|---|---|
| 1,475,258 | 11/1923 | Bundy | 228/147 |
| 3,399,450 | 9/1968 | Mize | 228/171 |
| 4,367,839 | 1/1983 | Angerer | 228/155 |
| 4,582,271 | 4/1986 | Takahashi . | |
| 5,191,911 | 3/1993 | Dubois . | |

FOREIGN PATENT DOCUMENTS

| | | |
|---|---|---|
| 2 024 425 | 8/1970 | France . |
| 23 14 507 B2 | 3/1973 | Germany . |
| 26 04 324 B2 | 2/1976 | Germany . |
| 44 34 133 A1 | 9/1994 | Germany . |

Primary Examiner—Samuel M. Heinrich
Attorney, Agent, or Firm—Ware, Fressola, Van der Sluys & Adolphson LLP

[57] ABSTRACT

During the production of long metal tubes with small diameters, where a metal tape is drawn from an annular coil, is gradually formed into a tube with a longitudinal slot and the longitudinal slot is welded, the internally and externally located metal tape ends of a number of annular coils are interconnected by welding, and the annular coils are horizontally positioned on tension rings which are attached to a rotatable take-up drum. The metal tape with the welded ends is drawn off without interruption.

7 Claims, 3 Drawing Sheets

METHOD AND DEVICE FOR PRODUCING LONG METAL TUBES

BACKGROUND OF THE INVENTION

1. Technical Field

The invention concerns a method for the production of long metal tubes with small diameters, where a metal tape is drawn from an annular coil, is gradually formed into a tube with a longitudinal slot and the longitudinal slot is welded, and a device for carrying out the method.

2. Description of the Prior Art

A method of producing an optical fiber cable element from a metal tube is known from DE 44 34 133 A1, where a metal tape is continuously drawn from an annular coil, it is formed into a tube with a longitudinal slot and the longitudinal slot is welded. In this case, the metal tube is used as protection for optical fibers which are inserted into the still open tube containing the longitudinal slot during the production of the metal tube. These metal tubes have a very small diameter, e.g. 3.5 mm and a wall thickness of 0.2 mm.

It is required or useful to be able to produce individual lengths of 6000 meters and longer, especially if such metal tubes with inserted optical fibers will be used in submarine or in overhead cables.

Since the annular coils which are delivered by the steel mills with the cited dimensions, i.e. a tape width of about 15 mm and a wall thickness of about 0.2 mm, can have a maximum tape length of 2000 to 2500 meters for reasons of annular coil stability and transportation. To obtain a 6000 meter length, the internally and externally located tape ends of the annular coils must be connected in series with so-called transverse welded seams.

Since the seam area must be stationary during the transverse seam welding, various possibilities have been developed in order not to interrupt the continuous tube production process.

One possibility is to rewind the metal tape before the tube production, i.e. the individual annular coils are rewound onto a larger supply coil, where the ends and the beginnings of two consecutive annular coils can be welded to each other while the winding process is interrupted. In this way, almost endless tape lengths can be produced with correspondingly larger supply coils.

Problems occur when the relation of the outer annular coil diameter to the tape width exceeds a certain size, since the stability of the annular coil is then lost and the individual windings begin to shift. Beyond that damage to the edges of the metal tape and also to the tape surface cannot be avoided in some metals because of cold-welding. Different tape expansions can also take place during the rewinding. Furthermore the rewinding process is very time-consuming and therefore costly.

A further possibility of producing tapes of long lengths includes introducing the metal tape drawn from the annular coil into a so-called storage device. When the end of the annular coil is reached, the end is held and welded to the beginning of a following annular coil. During the welding process, the tape material is removed from the storage device for continuous production (U.S. Pat. No. 5,191,911).

A device for producing longitudinally welded tubes from a metal tape is known from DE 26 04 324 B2, whereby several annular coils are tightly wound on a winding collar and the winding collar is arranged on a rotatable plate, while the longitudinal axis of the winding collar extends in the vertical direction. The metal tape is drawn first from the uppermost annular coil and is routed to the tube-shaping/welding station via a tape deflector and a tape storage device. When the first annular coil is used up, the beginning of the following annular coil is threaded into the tape deflector and routed to the transverse seam welding device, where it is welded to the tightly held end of the preceding annular coil. During these operations, the metal tape is routed from the tape storage device to the tube-shaping/welding station.

Working with a tape storage device proved to be unsatisfactory for very thin and narrow tapes, particularly with metals which have a cold-welding tendency.

SUMMARY OF THE INVENTION

An object of the invention is to present a method whereby it is possible to produce metal tubes with a diameter of less than 20 mm and a wall thickness of less than 0.4 mm in lengths of over 6000 meters. This object is achieved by having the internally and externally located ends of a number of annular coils of metal tape interconnected in series by welding. The annular coils are horizontally positioned on tension rings which are attached to a rotatable take-up drum allowing the metal tape to be continuously drawn off without interruption.

The significant advantage of the invention can be seen in that a long tape length can be provided for the tube production process from a number of annular coils without any rewinding. Tape damage and above all the expansion of the tape are avoided.

The invention will be fully understood when reference is made to the following detailed description taken in conjunction with the accompanying drawings.

DETAILED DESCRIPTION OF THE INVENTION

Figure 1:
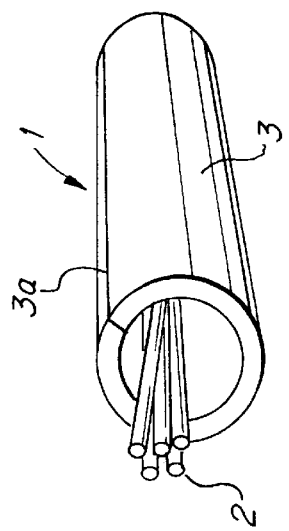
FIG. 1 shows a perspective view of a part of an optical fiber cable element produced in accordance with the principle of the invention.

Turning first to FIG. 1, an optical fiber cable element 1 made in accordance with the invention comprises the optical fibers 2 and the metal tube 3 surrounding the optical fibers 2 which has a longitudinally welded seam 3a. The open space between the optical fibers 2 and the metal tube 3 can be filled with a petroleum jelly to prevent water from migrating longitudinally. The number of optical fibers 2 is usually between 6 and 20, but it can be up to 40. The optical fibers 2 are longer than the metal tube 3, thus they extend inside the metal tube 3 in waves, helixes or sinusoidally. The excess length is normally about 0.3%. The wall thickness of the metal tube is 0.2 mm while its outside diameter is 3.5 mm. These are typical specifications for an optical fiber cable element used in a composite cable replacing a metal conductor wire therein. High-alloyed or austenitic steel is the preferred material for the metal tube 3.

Figure 2:
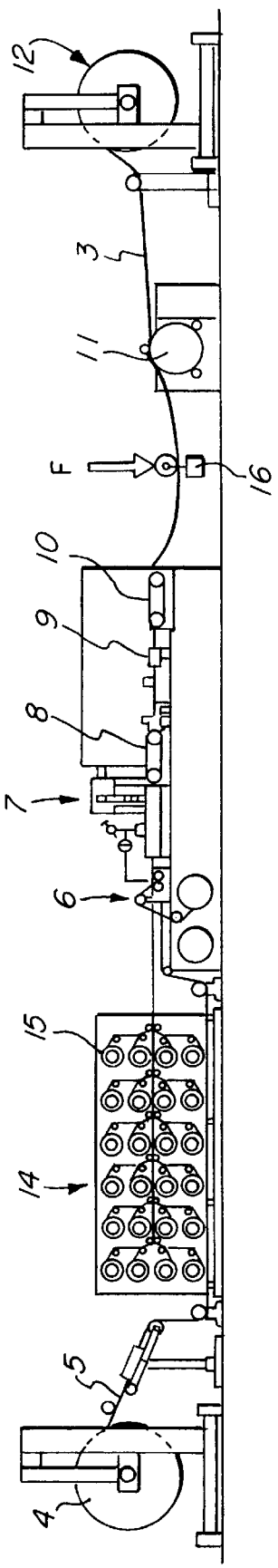
FIG. 2 is a side elevational view of a prior art device for practicing a prior art method of producing long metal tubes.

In FIG. 2, therein is illustrated a typical prior art device for producing an optical fiber cable element of FIG. 1 until now.

A tape 5 is continuously drawn from a supply coil 4 and is routed to a shaping device 6 in which the tape 5 is formed into a tube with a longitudinal slot. Part of this shaping device 6 is an edging arrangement not described in detail, whereby the tape 5 is precisely trimmed to the required width. The shaping device 6 furthermore comprises several sets of shaping rollers not described in detail. The longitudinal slot of the shaped tube is closed by means of a laser welding installation 7. The precise guidance of the slotted tube under the welding installation 7 is provided by a first set of chuck jaws 8 comprising a number of jaw pairs which encircle the tube and are driven by an endless chain. A tube reduction device 9, e.g. a drawing die, which reduces the diameter of the tube is located behind the first set of chuck jaws 8. A second set of chuck jaws 10 is located behind the tube reduction device 9 to grip the drawn tube and pull it through the drawing die. The drawing speed of the second set of chuck jaws 10 is controlled with respect to the drawing speed of the first set of chuck jaws 8 as a function of the passage of the tube between the drawing die and the first set of chuck jaws 8. A motorized puller drum 11 is located behind the second set of chuck jaws 10 and several windings of the tube rest on its peripheral surface. The puller drum 11 is driven at a speed which is equal to the drawing speed of the second set of chuck jaws 10. A take-up reel 12 is located behind the puller disk 11 and loosely rolls up the tube 3.

A pay-off device 14 feeds a number of optical fibers 2 into the tube as it is formed. The pay-off device 14 is equipped with a number of spools 15 on which the optical fibers 2 are wound.

In order for the optical fibers 2 to have an excess length inside the metal tube 3, the latter is continuously and elastically deformed by a force applying device 16, i.e. a weight. The force applying device 16 causes the metal tube to expand between the second set of chuck jaws 10, whose jaw pairs securely encircle the metal tube 3 and apply the deformation forces produced by the tube reduction device, and the puller drum 11. In this way, the same length of metal tube 3 and optical fiber 2 is wound on the puller drum 11. The condition of elastic deformation relaxes on the puller drum 11 and the metal tube 3 shortens to the normal condition creating the desired excess length of the optical fibers 2.

Figure 3:
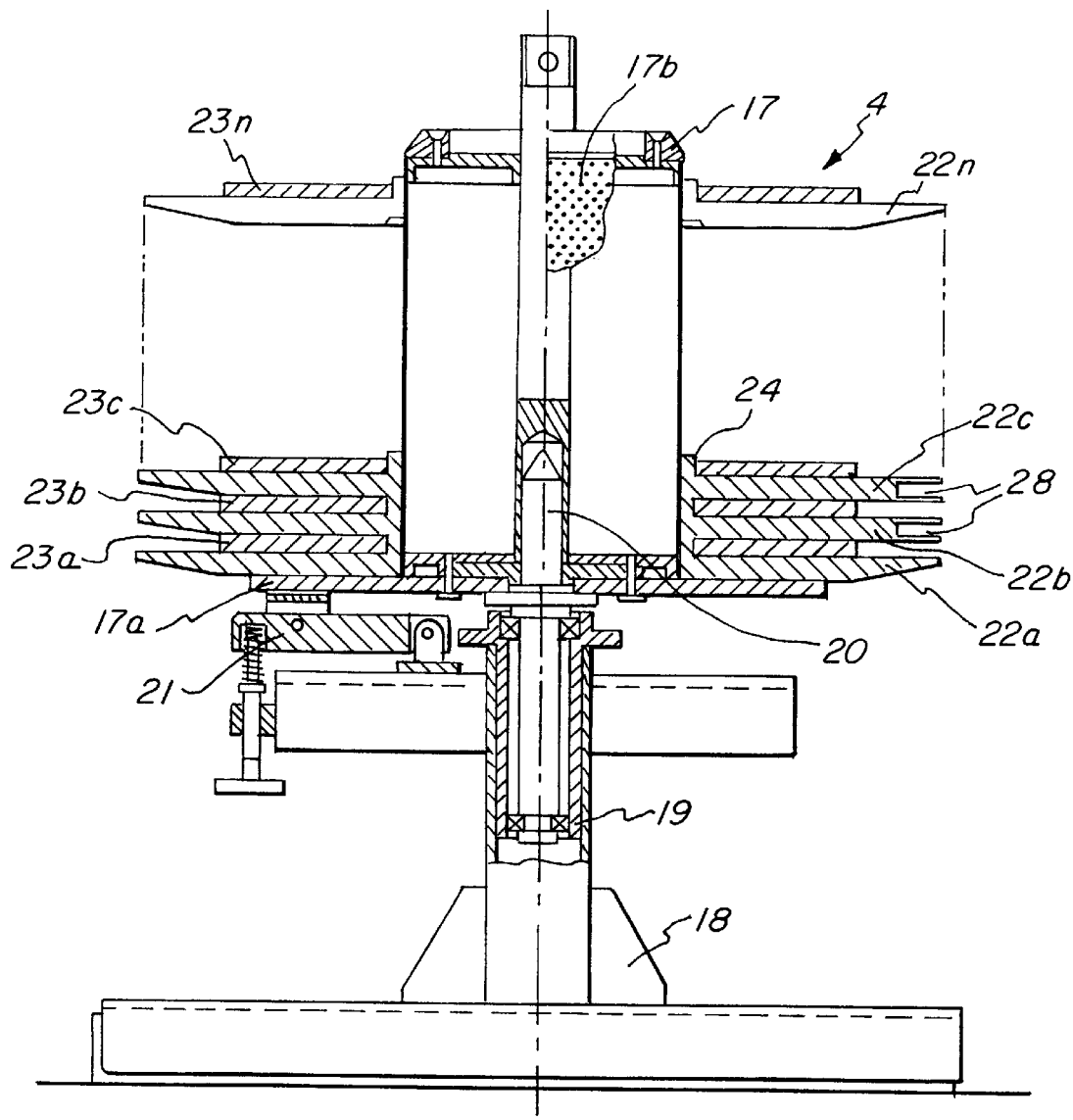
FIG. 3 is a side elevational view of a tape discharge used in the method of the present invention with portions broken away to show internal structure.

Turning to FIG. 3, the present invention provides an improved discharge for the tape 5. The tape discharge comprises a take-up drum 17 and a discharge support 18. The discharge support 18 includes a bearing 19 for the take-up drum 17. The take-up drum 17 is placed over a centering pin 20 whereby it is centered. The take-up drum 17 is able to rotate on the discharge support 18 and is braked by an adjustable braking device 21. The take-up drum 17 includes a take-up plate 17a to which a core 17b made from perforated sheet metal is attached. The take-up plate 17a supports a number of tension rings 22a, 22b, 22c . . . 22n, on which the annular coils 23a, 23b, 23c . . . 23n of metal tape are located. The annular coils 23 are securely clamped to the tension rings 22. The tension rings 22 are attached to the drum by means of stop pins which are not illustrated in FIG. 3, and are thus secured against twisting, so that the individual annular coils 23 cannot twist away from each other during the unwinding. This effectively prevents damage to the metal tape in the transition area between one annular coil and another. The annular coils 23 are positioned horizontally to allow the individual windings of the metal tape therein to lie fully relaxed in the annular coils 23.

The tension rings 22 are each superimposed on a flange-type elevation 24 on the inside diameter thereof. This elevation 24 is designed so that the distance between the tension rings 22 in the vertical direction is greater than the width of the metal tape. Typically, the metal tape width is no more than 25 mm with a tape thickness of no more than 0.3 mm.

Figure 4:
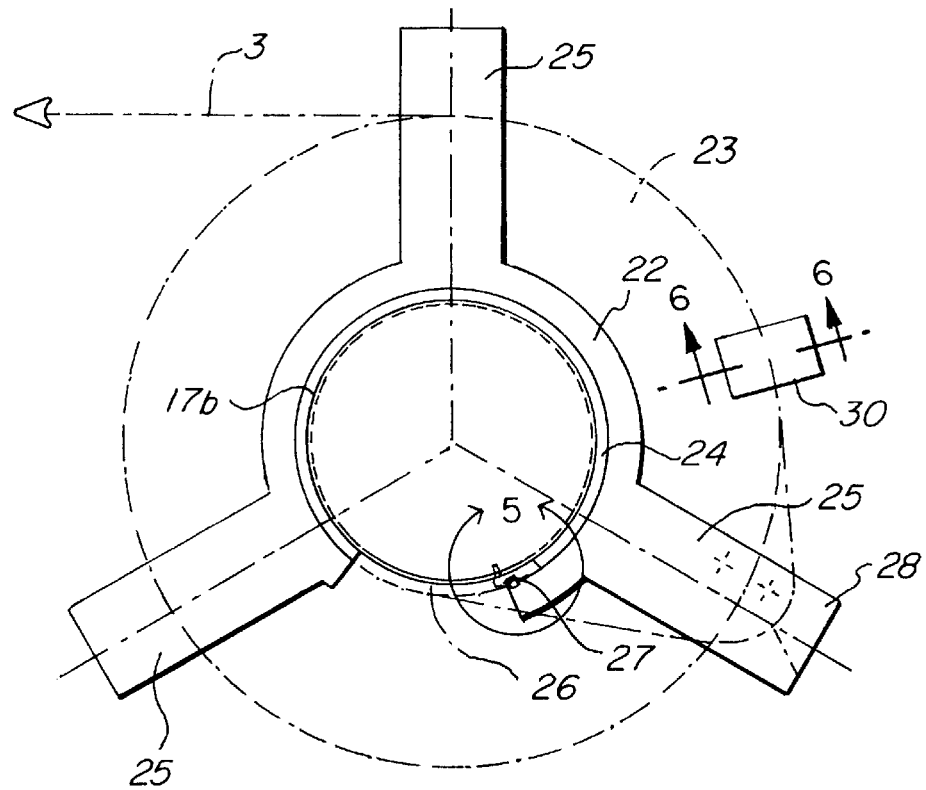
FIG. 4 is a top plan view of a tension ring on the core which is broken away.

Referring now to FIG. 4 which shows a typical tension ring 22. The tension ring 22 has three arms 25 extending radially and defines opening 26. Plastic, e.g. polyethylene, is used as the material for the tension ring 22. The opening 26 allows the tension ring 22 to be unclamped from its annular coil 23 when the two arms 25 that are adjacent to the opening 26 are moved towards each other. This decreases the inside diameter of the tension ring 22 and thereby the outer diameter of the elevation 24. In the relaxed condition, the outside diameter of the elevation would be larger than the inside diameter of the annular coil 23, in this manner each annular coil 23 is securely connected to its tension ring 22 by the resilience thereof. A stop 27 on the tension ring 22 includes a pin 27a (FIG. 5) into one of the holes in the core 17b made of perforated sheet metal.

FIG. 4 further illustrates the course of the metal tape 3 between two neighboring annular coils 23. The broken line extends from the inside diameter (internally located tape end) of the upper annular coil 23 to the outside diameter (externally located tape end) of the underlying annular coil 23. A tape deflection system in the form of a slot 28 (see also FIG. 3) at the outer end of one of the arms 25 provides for accurate tape deflection.

Figure 5:
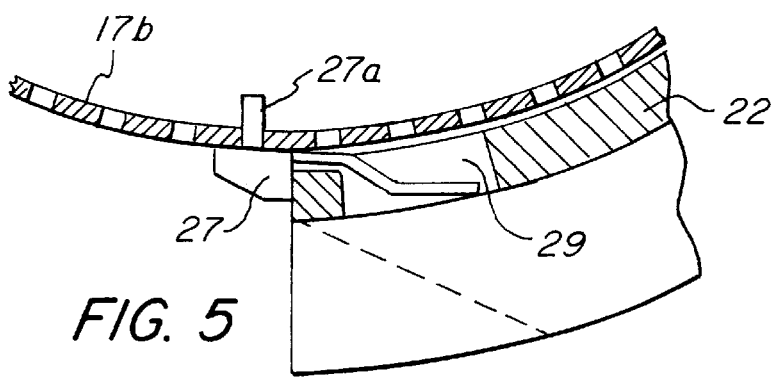
FIG. 5 is an enlarged top plan view within the circle 5—5 of FIG. 4 showing the arrangement of the stop which is located in a chamber of the tension rings.

As seen in FIG. 5, a portion of the stop 27 is located in a chamber 29 of the tension ring 22.

Figure 6:
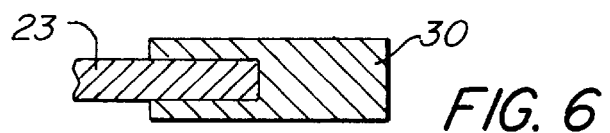
FIG. 6 is a cross-sectional view taken along the 6—6 line of FIG. 4.

In FIG. 6, a clamping part 30 made of polyethylene is pushed from the outside on the annular coils 23, between the arms 28. These clamping parts 30 prevent outer windings of the annular coils 23 from shifting. They drop off automatically when enough windings have been drawn off so that clamping is no longer feasible.

The following describes the production course of the stack of annular coils:

A first annular coil 23a is securely clamped to a first tension ring 22a and is attached to the core 17b of the take-up drum 17 by means of the stop pin 27. A second annular coil 23b is placed on a not illustrated holder so that the inside windings of the annular coil 23b can be freely accessed. The externally located metal tape end of the first annular coil 23a (outside diameter of annular coil 23a) is connected by means of laser welding to the internally located metal tape end of annular coil 23b (inside diameter of annular coil 23b). Next the tension ring 22b is clamped to the annular coil 23b, while the metal tape between the annular coil 23a and 23b must be inserted into the tape deflection segment (i.e., slot 28) of tension ring 22b. Next the tension ring 22b with the annular coil 23b thereon is placed on the tension ring 22a positioned on the take-up drum 17. Care must then be taken so that the metal tape is taut between the two annular coils 23a and 23b and inside the slot 28. The clamping parts 30 are pushed on every annular coil 23.

The remaining tension rings 22c to 22n and the annular coils 23c and 23n are handled in the same manner. After the desired tape length is attained by connecting the annular coils 23 with each other, the assembled take-up drum 17 is placed on the discharge support 18 and the externally located end of the tape of annular coil 23*n* is threaded into the tube production installation.

After these operations, the production of the tube or the optical fiber cable element can begin.

The preferred embodiment described above admirably achieve the objects of the invention. However, it will be appreciated that departures can be made by those skilled in the art without departing from the spirit and scope of the invention which is limited only by the following claims.

What is claimed is:

1. A method of producing small diameter metal tubes of long lengths, comprising the steps of:
    (a) providing a metal tape in a series of annular coils on a rotatable metal drum, each annular coil being positioned generally horizontally on its own tension ring attached to the rotatable drum, wherein the series of annular coils has a first annular coil with internally located tape end and a second annular coil with externally located tape end, the internally located tare end of the second annular coil is welded to the externally located tape end of the first annular coil;
    (b) pulling the metal tape so the metal tape unwinds from the series of annular coils;
    (c) gradually forming the metal tape into a tube with a longitudinal slot as the metal tape unwinds from the series of annular coils; and
    (d) welding the longitudinal slot of the tube to form a welded tube.

2. A method as claimed in claim 1, wherein the metal tape is an austenitic steel tape.

3. A method as claimed in claim 2, wherein the metal tape has no more than a 25 mm tape width and no more than a 0.3 mm wall thickness.

4. A method as claimed in claim 1, wherein the metal tape is a plurality of metal tapes welded end to end between the annular coils.

5. A method as claimed in claim 1, wherein the series of annular coils is vertically stacked on the rotatable drum.

6. A method of producing small diameter metal tubes of long lengths, comprising the steps of:
    (a) providing a metal tape in a series of annular coils, each annular coil being positioned generally horizontally on its own tension ring attached to a rotatable drum, wherein the providing step includes:
        (i) providing a first tension ring equipped with a first annular coil secured on the rotatable drum,
        (ii) welding an internally located tape end of a second annular coil to an externally located tape end of the first annular coil,
        (iii) securing the second annular coil to a second tension ring,
        (iv) securing the second tension ring with the second annular coil to the rotatable drum above the first annular coil, and
        (v) routing a portion of the metal tape to form a helix between the first annular coil and the second tension ring, and repeating the above steps with further annular coils and their respective tension rings to form the series of annular coils;
    (b) pulling the metal tape so the metal tape unwinds from the series of annular coils;
    (c) gradually forming the metal tape into a tube with a longitudinal slot as the metal tape unwinds from the series of annular coils; and
    (d) welding the longitudinal slot of the tube to form a welded tube.

7. A method as claimed in claim 6, wherein the externally located tape end of the last annular coil in the series of annular coils is drawn off first.

* * * * *

UNITED STATES PATENT AND TRADEMARK OFFICE
CERTIFICATE OF CORRECTION

PATENT NO. : 6,027,011
DATED : February 22, 2000
INVENTOR(S) : Harry Staschewski It is certified that error appears in the above-indentified patent and that said Letters Patent is hereby corrected as shown below:

In column 5, line 22 (claim 1, line 9), "tare" should be --tape--.

Signed and Sealed this

Third Day of April, 2001

Attest:

NICHOLAS P. GODICI

Attesting Officer     Acting Director of the United States Patent and Trademark Office